US008793107B2

(12) United States Patent
Miller et al.

(10) Patent No.: US 8,793,107 B2
(45) Date of Patent: Jul. 29, 2014

(54) ACCURACY-BASED SIGNIFICANT POINT DERIVATION FROM DENSE 3D POINT CLOUDS FOR TERRAIN MODELING

(75) Inventors: Stephan W. Miller, Melbourne, FL (US); Jeffrey W. Houser, Melbourne, FL (US); Mark Rahmes, Melbourne, FL (US); Morteza Akbari, Rockledge, FL (US)

(73) Assignee: Harris Corporation, Melbourne, FL (US)

( * ) Notice: Subject to any disclaimer, the term of this patent is extended or adjusted under 35 U.S.C. 154(b) by 343 days.

(21) Appl. No.: 13/308,853

(22) Filed: Dec. 1, 2011

(65) Prior Publication Data

US 2013/0144565 A1   Jun. 6, 2013

(51) Int. Cl.
*G06T 17/05* (2011.01)
*G06T 17/20* (2006.01)

(52) U.S. Cl.
CPC ............. *G06T 17/05* (2013.01); *G06T 17/20* (2013.01); *G06T 2207/10028* (2013.01)
USPC ............................................ 703/2; 382/154

(58) Field of Classification Search
CPC ................. G06T 17/20; G06T 17/05; G06T 2207/10028; G06F 17/18
See application file for complete search history.

(56) References Cited

U.S. PATENT DOCUMENTS

| 7,305,121 | B2  | 12/2007 | Kaufmann et al. |
| 7,391,899 | B2* | 6/2008  | Rahmes et al. ............... 382/154 |
| 7,720,647 | B2  | 5/2010  | Chang et al. |
| 7,778,808 | B2* | 8/2010  | Miller et al. ..................... 703/2 |
| 7,925,110 | B2  | 4/2011  | Chang et al. |
| 8,452,084 | B2* | 5/2013  | Ben-Moshe et al. .......... 382/163 |
| 2009/0089017 | A1* | 4/2009 | Kelley et al. ........................ 703/1 |
| 2010/0100835 | A1* | 4/2010 | Klaric et al. .................. 715/765 |
| 2013/0271463 | A1* | 10/2013 | Curington et al. ............ 345/420 |

OTHER PUBLICATIONS

Tsai, Victor "Delaunay Triangulation in TIN Creation: an overview and a linear-time algorithm" Int'l J. Geo. Inf. Sys., vol. 7, No. 6, pp. 501-524 (1993) DOI: 10.1080/02693799308901979 (Abstract only).*
Garland, Michael & Heckbert, Paul "Fast Polygonal Approximation of Terrains and Height Fields" CMU-CS-95-181 (1995).*
Li, Xuanying "A Hybrid Algorithm for Terrain Simplification" Masters Thesis, U. British Columbia (2003).*
Lee, Hyun & Younan, Nicolas "DTM Extraction of Lidar Returns Via Adaptive Processing" IEEE Transactions on Geoscience & Remote Sensing, vol. 41, No. 9, pp. 2063-2069 (2003).*
Liu, Yu-Shen, et al., "Automatic least-squares projection of points onto point clouds with applications in reverse engineering". Computer Aided Design 38 (2006) 1251-1263; Available online at www.sciencedirect.com.

* cited by examiner

*Primary Examiner* — Kamini S Shah
*Assistant Examiner* — Jay B Hann
(74) *Attorney, Agent, or Firm* — Fox Rothschild, LLP; Robert J. Sacco

(57) ABSTRACT

Method includes calculating a mean z coordinate value for points within the point cloud. An initial set of points is selected which have z coordinate values which deviate from the mean by at least an initial value. Thereafter, a triangulated irregular network (TIN) is constructed using the initial set of points. The method continues by determining if there is a significant point that exists among the points contained within an x, y extent of each triangle. If so, the TIN is updated to include the initial set of points and any significant points determined to exist within the triangles that form the TIN. Thereafter, the method continues by repeating the determining and the updating steps until there are no additional significant points found within the triangles.

27 Claims, 10 Drawing Sheets

| Allowable Vertical Error | Percentage of Total Data Set Used to Create Terrain Model |
|---|---|
| +/- 0.1 meter | 95% |
| +/- 0.2 meter | 92% |
| +/- 0.3 meter | 90% |
| ... | ... |
| +/- 3 meter | 31.74 |
| ... | ... |
| +/- 9.8 meter | 9% |
| +/- 9.9 meter | 7% |
| +/- 10 meter | 5% |

Table 1

FIG. 9

| x-coordinate$_0$ | y-coordinate$_0$ | z-coordinate$_0$ | Significance$_0$ |
| --- | --- | --- | --- |
| x-coordinate$_1$ | y-coordinate$_1$ | z-coordinate$_1$ | Significance$_1$ |
| x-coordinate$_2$ | y-coordinate$_2$ | z-coordinate$_2$ | Significance$_2$ |
| . . . | . . . | . . . | . . . |
| x-coordinate$_{n-1}$ | y-coordinate$_{n-1}$ | z-coordinate$_{n-1}$ | Significance$_{n-1}$ |
| x-coordinate$_n$ | y-coordinate$_n$ | z-coordinate$_n$ | Significance$_n$ |

Table 2

Fig. 11

ACCURACY-BASED SIGNIFICANT POINT DERIVATION FROM DENSE 3D POINT CLOUDS FOR TERRAIN MODELING

BACKGROUND OF THE INVENTION

1. Statement of the Technical Field

The inventive arrangements relate to three-dimensional point cloud data for terrain modeling, and more particularly to methods for evaluating and recording the significance of data points within the point cloud for improved management of dense, potentially diverse terrain survey data.

2. Description of the Related Art

Three dimensional scanning systems can measure in an automatic way a large number of points forming the surface of the earth, or some other object, and can output a point cloud as a data file. The point cloud represents the set of points in a three dimensional space that the device has measured with respect to a set of coordinate axes. One example of a three dimensional scanning system is LIDAR (Light Detection And Ranging). LIDAR is an optical remote sensing technology that can measure the distance to a target by illuminating the target with light, often using pulses from a laser. LIDAR data has proven its worth, consistently producing accurate and detailed results across many applications including those associated with environmental, engineering and forestry. Although LIDAR has many advantages, there are certain problems associated with its use. One such problem is the very large quantity of information usually associated with point cloud data. In fact, point cloud data has consistently proven to be problematic due to its enormous density and volume. As a result, most applications perform rendering operations by means of an interpolation process that produces a new representation of the data. The new representation is typically produced in the form of a regular or periodic grid of data points, but this process can be destructive of important information contained in the data.

In order to appreciate the volume and density of information associated with LIDAR data, it may be noted that ground spacing between points associated with a LIDAR terrain scan can be 3 cm or even smaller in some cases. Thus, for any appreciable size terrain area, points can number in the hundreds of millions to billions. Files (usually multiple files) for such data are measured in gigabytes. Model significant point derivation schemes (sometimes referred to herein as point selection or data thinning schemes) can be used to reduce the volume of point cloud data. However, the various conventional schemes that have been devised in the art have not been found to provide completely satisfactory results. For example, decimation schemes thin data by simply eliminating every nth data point without any consideration as to the significance of such points. In this regard, a decimation scheme may select only every 10th point, or 50th point, for inclusion in a data set, and will eliminate all others. One problem with this approach is that it can and will miss significant points in the terrain, such as peaks in hills and bottoms of valleys in the terrain. Another type of established thinning or point selection is a grid digital elevation model (DEM) scheme. However, grid schemes require a (possibly arbitrary)_selection of an appropriate grid size for the thinning process. Even so, such schemes may still select only the highest/lowest points in each grid or may compute an interpolated value at a post or grid cell midpoint based on very dissimilar point values. Accordingly, a grid scheme will also inevitably miss significant points within each grid, or will be subject to the limitations of the interpolation scheme used. Avoidance of these problems requires an extremely small post spacing of points in a DEM and the size of these DEM files themselves then become a processing issue. Compression methods can apparently be used with good results when dealing with point cloud data. Still, these compression methods often require conversion to and from the compressed form to perform work with the data, and do not seek to remove truly redundant or insignificant points from the scheme.

SUMMARY OF THE INVENTION

Embodiments of the invention concern a method for processing point cloud data defined within a three-dimensional coordinate system. The method includes calculating a mean z coordinate value for points within the point cloud. Thereafter an initial set of points is selected from the point cloud data. The initial set of points are those which have z coordinate values which deviate from the mean by at least an initial significance value. This value can be set directly or indirectly by a terrain modeler or computed from statistical assessments of the data that follow as a part of the quality control that accompanies terrain surveys in the existing art. Thereafter, a triangulated irregular network (TIN) is constructed using the initial set of points. The method continues by determining if there is a significant point that exists among the points contained within an x, y extent of each triangle. If so, the TIN is updated to include the initial set of points and any significant points determined to exist within the triangles that form the TIN. Thereafter, the method continues by repeating the determining and the updating steps until there are no additional significant points found within the triangles. A point is identified as a significant point only if it satisfies certain criteria. For example, the point must have a z coordinate value that deviates from a plane of the triangle within which the x, y position of the point is contained. The point must deviate from the plane by an amount which is greater than or equal to all other of the other points within the x, y extent of the triangle. Further, the point must have a z coordinate value that deviates from the plane of the triangle by an amount exceeding an allowable vertical error (AVE) limit. At the conclusion of processing, a subset of all significant cloud points can be made or significance can be associated with each evaluated point and this value can then be used in subsequent retrievals of the data.

BRIEF DESCRIPTION OF THE DRAWINGS

Embodiments will be described with reference to the following drawing figures, in which like numerals represent like items throughout the figures, and in which:

FIG. 9 shows an example of a table that can be generated to allow a user to directly relate allowable vertical error (AVE) to a percentage of a total point cloud data set that is used to create a terrain model.

FIG. 11 is an example of a table which can be generated that is an ordered list of potentially significant points, where a significance value has been assigned to each evaluated point.

DETAILED DESCRIPTION

Figure 1A:
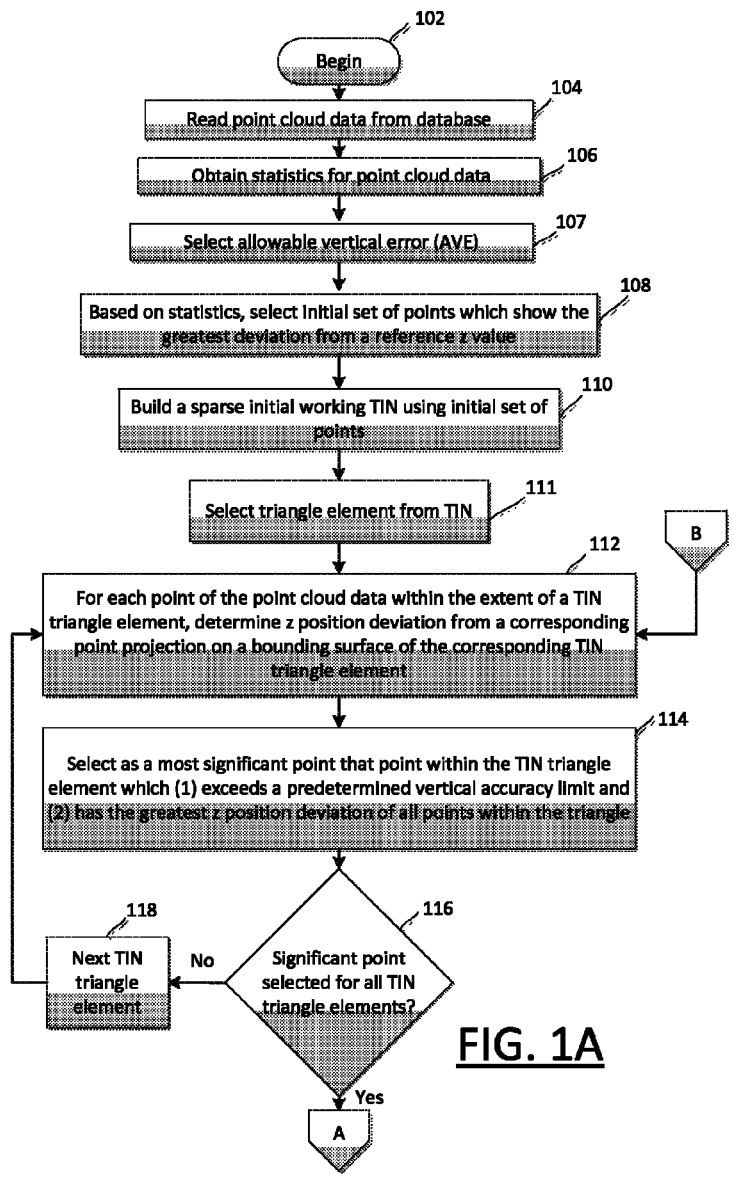
FIGS. 1A and 1B (collectively FIG. 1) collectively provide a flowchart that is useful for understanding a process for accuracy-based thinning of dense three-dimensional point clouds.

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Three dimensional geospatial point cloud data often represents an oversample of surface points for many applications where such data is actually used. The oversampling is an act of necessity owing to the critically small size for important earth phenomena. Vertical discontinuities in the terrain (e.g. cliffs, waterfalls, vertical sides of building, vertical cut banks in streams, and retaining walls) require a sample rate that approaches zero if it the data is to be successful handling these sparse but critical features. Some of these points are simply more important than others because of their prominence in nature. As a consequence of oversampling, however, an abundance of insignificant (and perhaps even redundant) points are captured. The inventive arrangements of the instant method will identify points as being significant based on the deviation of the point's z-value as assessed against a working model of the surface and upon an acceptable vertical error term. The acceptable vertical error term can be selected directly by a user, or can be developed from a statistical evaluation of the points against known control samples of the true earth surface. In either case, the process described herein removes points from further consideration if they do not significantly deviate from the best prevailing surface approximation based on other points previously found significant.

In some embodiments, these points that are removed from further consideration can be eliminated from the point cloud data set. Alternatively, some or all of the points normally removed from further consideration can be retained, and a significance value is assigned and recorded for each point. The significance value described here is similar to a figure of merit (FOM) for each point as is sometimes used in a DEM. As implemented most often in terrain modeling, however, an FOM is usually an ordinal measurement value. Here significant values are interval or ratio measures and their uses in managing, retrieving and analyzing data are greater.

A triangulated irregular network (TIN) is a well known data structure that is commonly used for representing a surface. For example, a TIN can be used to represent terrain comprising a portion of the earth's surface. A TIN is comprised of irregularly distributed nodes or points. The points are defined by three-dimensional coordinates (x, y, and z) and connected by lines or edges to form triangles. The triangles are arranged to form a network in which the triangles do not overlap. The nodes or points of a TIN commonly do not have a constant or periodic distribution but are instead distributed in accordance with an algorithm which facilitates identification of those points that best represent the terrain for a given need. This allows the terrain to be represented using fewer points as compared to other data structures where points of data are represented regardless of whether they are significant to understanding the terrain. Another advantage of the TIN data structure is that the terrain or other surface can be conveniently visualized by rendering the triangles so as to form a triangular tessellation.

The present invention uses an initial TIN and one or more intermediate TINs to help select significant points within a set of point cloud data which should be retained and those that can be removed. Before proceeding further, it should be noted that the term "point cloud" technically can be used generally to refer to any set of three dimensional geo-spatial data (e.g. a data product derived from LIDAR sensing). But in actual use, the raw point cloud data is usually first segmented into classes of data. The most important of these classifications is the bare earth segmentation of point cloud data that is commonly used for terrain modeling though other forms such as a digital surface model (DSM) can be used as well. The bare earth data product is well known in the art and therefore will not be described here in detail. However, it generally refers to a portion of the data set which represents bare earth terrain, exclusive of vegetation. In the case where the data has been produced using LIDAR, the bare earth data product usually includes only the lowest elevation LIDAR returns. These are returns produced when a laser pulse hits a hard feature, such as the bare earth terrain, concrete, asphalt or rooftop. The bare earth product or segmentation will generally exclude laser pulse returns associated with tops of trees and other vegetation. As used herein, references to "point cloud data" should generally be understood as referring to such bare earth portion of the point cloud data set. However, those skilled in the art will appreciate that the same techniques can be applied for other segmentations of a point cloud data set and all such data sets are intended to be included within the scope of the invention.

The process can begin with an initial selection of extreme high and low data point values (i.e. extreme values with respect to the z coordinate value). These extreme values are then used to form an initial sparse TIN for the point cloud extent in the x, y and z directions. This sparse TIN forms what is referred to herein as a working TIN model and may be thought of as defining a three-dimensional surface composed of triangles. Thereafter, all points in the point cloud are compared in the z coordinate direction to their corresponding point projection on the bounding three-dimensional plane surface of a corresponding TIN element in which they are contained. At each pass through the point cloud, there is selected at most a single point within each triangle as the significant point. This is the point which (1) deviates to the greatest extent in z above or below the bounding surface of the working TIN and (2) exceeds certain predetermined vertical accuracy limits by the greatest margin. For purposes of optional ordering of the point data in a subsequent step, the deviation distance from each evaluated point to the plane is recorded as the current value of significance for the point. Other forms of significant measures can be realized, such as the volumetric change in the surface due to adding the significant point.

The significant points which have been selected for each triangle in this pass (which involves consideration of all points in the point cloud), are then added to the working TIN model. These points are then used to form a more densely populated TIN, with more nodes and triangles, and a better successive approximation of the true surface. Thereafter, those points which are sufficiently close to the plane defined by a triangle element of the working TIN can be designated as insignificant, and marked as such. If significance recording is enabled, the final significant values for each such point are recorded and the points are then flagged or marked as removed from the point cloud. The marking can be used to designate points which are to be removed from further consideration or thinned. Alternatively, the points can be retained and the marking can be used to identify the relative significance of each data point. The process repeats until all points in all triangle elements are found insignificant.

Figure 1B:
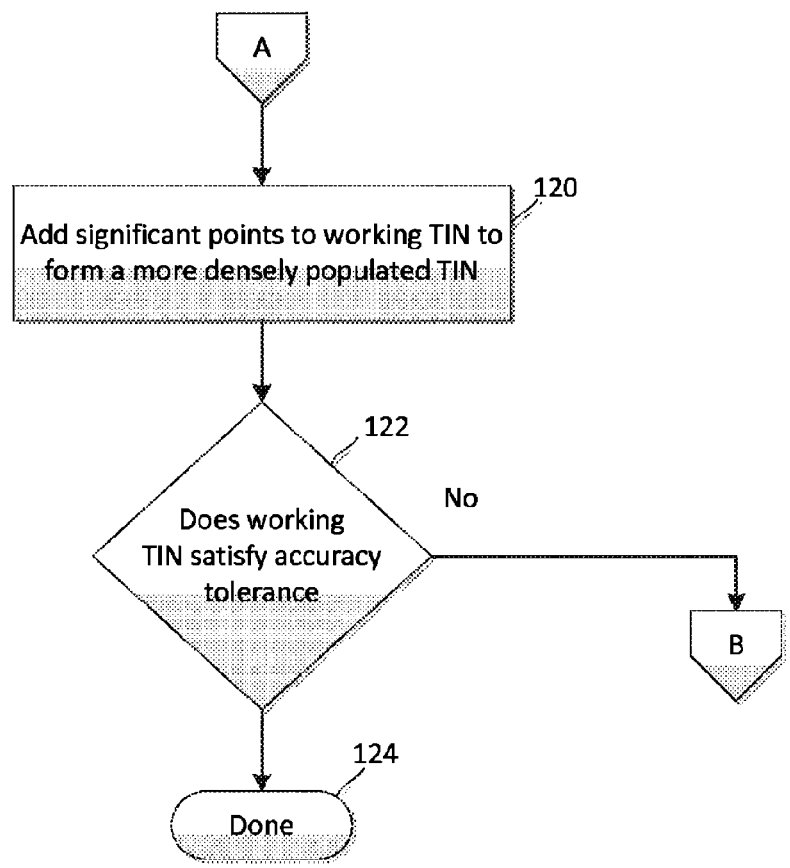

Referring now to FIG. 1, there is provided a flowchart that is useful for understanding an accuracy based method for thinning dense three-dimensional point cloud data. The method begins in step 102 and continues to step 104 where point cloud data is accessed or retrieved from a database. The point cloud data will generally include for each point an x, y, and z coordinate corresponding to the location of that point with respect to a three dimensional coordinate system. The coordinate system is defined by orthogonal x, y, and z axes. As will be familiar to those skilled in the art, the z coordinate for each point will generally represents an elevation of a data point with respect to a corresponding x, y location on the surface of the earth. Still, the invention is not limited in this regard and other alternatives are also possible.

In step 106, the method continues with a determination of certain statistical information associated with the point cloud data. In some embodiments, the statistical information can be calculated in advance and stored with the point cloud data in a database. In other embodiments, the statistical data can be calculated at the time when the point cloud data is retrieved from the database by using an optional control point set well known to practitioners of the art. Control points are of higher order accuracy than survey points and differences between survey z-values and the known z of a control point render an estimate of the survey data quality. In general, the statistical information will include at least two elements. A first one of the elements can be a statistical average or mean for the z values associated with all points in the x, y extent of the point cloud data. This mean $z_m$ value represents an average elevation for the area included within the x, y coordinates of the point cloud data and serves as a reference from which the deviation of each point in the point cloud data can be determined with respect to the z axis. As such the mean $z_m$ value is sometimes referred to herein as a reference z value. A second statistical element optionally includes the root mean square error (RMSE) of the point cloud data relative to a collection of higher order, more accurate, control measurements of the actual surface. The method of calculating the RMSE element, and its purpose will be discussed below in greater detail.

In step 107, an allowable vertical error (AVE) value will be selected. The AVE value defines the amount of error that the user is willing to tolerate in a final data set (i.e., after the process of thinning the point cloud data has been completed) versus the original data set. For example, a user could decide that a final data set need only represent a surface or terrain to within four (4) meters. In that case, the AVE value would be selected by the user to be +/−4 meters. Also, it should be appreciated that in some embodiments, the AVE value can be preset by a system administrator or a programmer. Also, the preferred AVE value can be determined automatically in some embodiments. For example, an AVE value can be selected by making use of the RMSE information calculated in step 106. Methods for automatic selection of the AVE value will be described in more detail as the discussion progresses.

The method continues in step 108 in which an initial set of points are selected. The initial set of points are selected based on an evaluation of each point's z coordinate deviation from the mean z value (zm) of the point cloud data. In some embodiments, the deviation can be pre-determined as part of step 106. Alternatively, the deviation for each point can be iteratively computed as needed for purposes of evaluation. In step 108, the set of initial points are selected to include those which generally have the greatest absolute deviation from the mean z value. For example, in some embodiments, the set of initial points can be all points which have a magnitude of deviation from the mean z value that exceeds 99% of all data contained in the point cloud. This will result in only 1% of the total number of data points from the point cloud being included in the initial set of points. Other criteria can also be used for selecting the initial set of points, provided that such criteria will result in selection of a relatively small subset of the point cloud data which has the greatest deviation from the mean. For example, the relatively small subset can be about 5% of the overall data in some embodiments. In other embodiments, the relatively small subset can be less than 10%, 20% or 30% of the total point cloud data set. This percentage number is the amount of point data a user wishes to retain for the initial set of points. Still, the invention is not limited in this regard and the exact criteria used to select the size of the initial set of points will depend on many factors, such as the size of the data set, the size of the desired output data set, and the desired approximation of the surface of the thinned model as compared to the original set of points.

In some embodiments of the invention, the initial set of points can be selected to include only those which deviate from the mean by a some selected amount. For example, this selected amount can be defined as two standard deviations from the mean z value zm. In that case, the initial set of points would include only about 5% of the total number of points in the point cloud data set (assuming a normal distribution). The concept of standard deviation as applied to a data set is well known in the art, where the standard deviation of a data set is the square root of its variance. Still, it should be understood that the invention is not limited to selecting the initial set of points in this way, and other methods can also be used for selecting the initial set of points.

Figure 2:
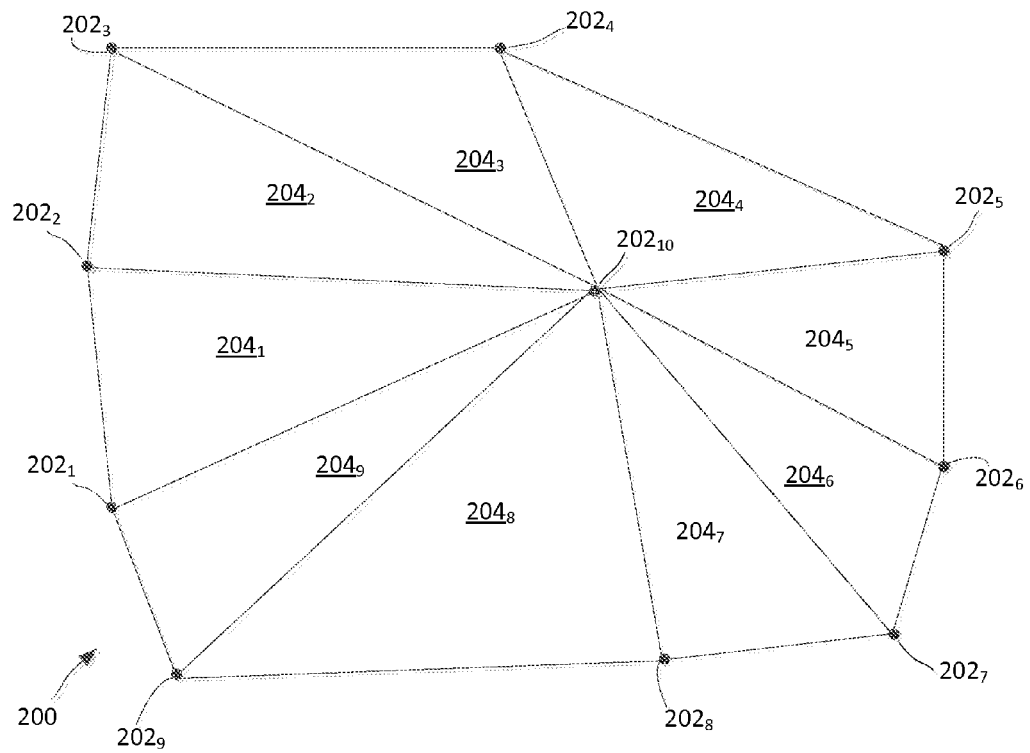
FIG. 2 is an example of a sparse triangulated irregular network (TIN) which is formed from an initial selection of extreme points in a point cloud data set.

Once the initial set of minimum and maximum points is selected, a sparse working TIN is constructed in step 110. An example of a sparse working TIN 200 is shown in FIG. 2. Step 110 includes a selection of a subset of bounding points in x and y and an initial triangulation of these points. In FIG. 2, the bounding points are 2021, 2022, 2023, . . . 2029. A convex hull of this point subset is normally chosen for the boundary such that all original point cloud points are contained within these bounds. The concept of a convex hull is generally well understood in the art. A convex hull generally comprises a set of boundary lines that connect the boundary points forming the outermost boundary of the point cloud data in the x, y extent. As will be appreciated by those skilled in the art a convex hull will generally have no exterior concavity formed by the lines connecting the boundary points. A convex hull is represented in FIG. 2 by the outermost bounding lines of the TIN shown therein.

The initial working TIN is formed using the bounding points and by employing a constrained Delaunay triangulation. The Delaunay triangulation method is well known in the art and therefore will not be described here in detail. In general, however, applying Delaunay triangulation methods to form the TIN will minimize the occurrence of elongated triangles. The constraint condition on the initial working TIN is that all edges formed from consecutive boundary points are retained as "breakline edges." Consecutive boundary points are those which are adjacent and on the boundary of the convex hull. For example, in FIG. 2, points 2027 and 2028 would be consecutive boundary points. Similarly, points 2028 and 209 would be consecutive boundary points. Breakline edges are lines in FIG. 2 which extend between consecutive boundary points. Under these conditions, triangles formed between a breakline edge and any non-consecutive point having a centroid interior to the convex hull will lie interior to the boundary polygon.

Once all such connections are established and the minimum and maximum subset points are added to the boundary TIN, an initial version of the working TIN is formed. All triangles and edges formed hereafter using the working TIN will likewise be contained by the boundary polygon. Practically, this ensures that all points from the interior of the boundary polygon are within one and only one of the working TIN triangle elements. In FIG. 2, a single point 20210 is contained within the convex hull, but it will be appreciated that in the case of real point cloud data, many more points would normally be contained therein.

From the foregoing it will be understood that the working TIN 200 is formed of a plurality of points 2021, 2022, 2023, ... 20210 comprising the initial set of points selected in step 108. Each one of the points 2021, 2022, 2023, ... 20210 is one that has a relatively large deviation from a z axis mean as determined in step 108. Moreover, each point has an x, y, and z coordinate which defines its location in space and corresponds to a measurement for that particular location within a terrain or surface.

In an actual sparse working TIN for a particular terrain or surface, the number of points would generally be substantially larger than the number shown in FIG. 2; however the TIN 200 is sufficient for explaining the various embodiments of the present invention. Note that the initial set of points 2021, 2022, 2023, ... 20210 are irregularly distributed along the convex hull of the point set in the x, y and z direction. In this example, the highest point in the point cloud is 20210 and connected by lines to form triangles 2041, 2042, 2043, ... 2049. These triangles are arranged to form a network where triangles do not overlap. As may be observed from FIG. 2, the sparse working TIN 200 facilitates a coarse visualization of the terrain or other surface represented by the initial set of points. Also, each triangle defines a plane or face defined by the x, y, and z coordinates of its vertices. In the present invention, that plane defined by each triangle serves as a reference. Specifically, the plane serves as a reference for evaluating a deviation of other points in the point cloud data that are inside the bounds of a working triangle as hereinafter described.

The method continues on to step 111-116 in which new significant points are identified for inclusion in the TIN. In general, this process involves evaluating points in the point cloud which have coordinates within the x, y extent of a particular triangle of the working TIN and have not previously been found significant. Since they have not previously been found significant, such points are not yet included in the TIN. More particularly, the process involves finding within each triangle a new significant point, and then adding that point to the TIN if it satisfies certain conditions. In this way, data points from the point cloud are selectively added to the TIN to increase the number of TIN points in the model. According to a preferred embodiment, the most significant data point in each triangle 2041, 2042, 2043, ... 2049 is the one that has the greatest deviation from a plane defined by the x, y, z coordinate points that define the vertices of the particular triangle. The foregoing process of identifying the most significant data point is described below in greater detail.

Figure 5:
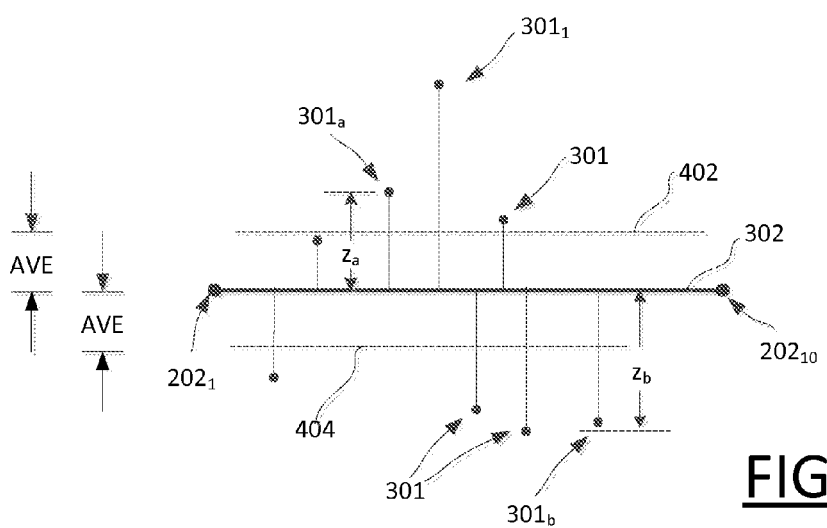
FIG. 5 is a side view of the surface in FIG. 3, showing the upper and lower accuracy surfaces.
Figure 3:
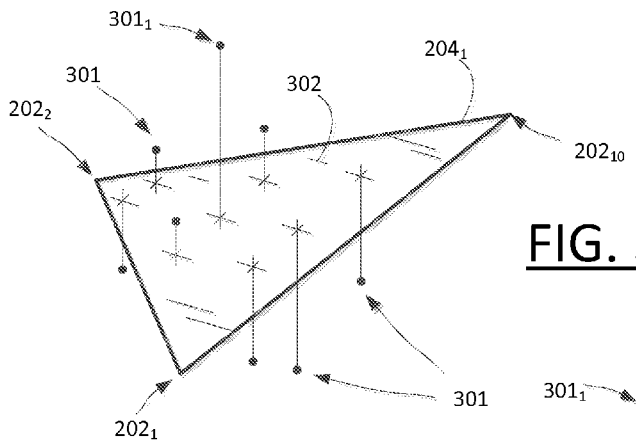
FIG. 3 is a perspective view of a surface defined by one triangle element of the sparse TIN in FIG. 2 and showing a position of a plurality of points of a point cloud relative to the surface.

In step 111, a triangle element is selected from among the plurality of triangle elements 2041, 2042, 2043, ... 2049 comprising the TIN 200. For purposes of this example we assume that the first triangle element selected from TIN 200 is triangle 2041, which is defined by points 2021, 2022, and 20210. A plane 302 defined by points 2021, 2022, and 20210 of triangle 2041 is shown in perspective view in FIG. 3. The plane 302 is shown in a side view in FIG. 5. As shown in FIGS. 3 and 5, a plurality of points 301 have locations above and below the plane 302. In step 112, each point 301 of the point cloud data within the x, y extent of triangle 2041 is evaluated. The x, y extent of the triangle is defined as x, y coordinates contained within the area of the triangle. Examples of z position deviations za, zb for two different points 301a and 301b are illustrated in FIG. 5. Depending on the z coordinate of each data point 301, it will generally have a position that is either above, below or coincident with a plane 302 defined by the points 2021, 2022, and 20210. The evaluation in step 112 comprises a determination of the magnitude of the deviation of each point relative to the plane 302, for each point within the x, y extent of the triangle.

After the magnitude of deviation for each point is calculated in step 112, an analysis is performed in step 114 to determine a significant point 301 within the triangle under consideration. The significant point is selected from among those points in the point cloud data that are not already included in the TIN, and that have x, y coordinates that are within the x, y extent of the triangle. The significant point is defined as the one that satisfies two specific requirements. The first requirement is that the deviation of the data point 301 from the plane 302 of the triangle must exceed the allowable vertical error (AVE) defined in step 106. If the magnitude of deviation for a particular point does not exceed the AVE, then it will not qualify for consideration as a significant point. Among those points that do qualify for consideration, the second requirement is that the data point 301 must also have a z position deviation magnitude relative to plane 302 that exceeds all other qualified data points 301 within the triangle under consideration. In triangle $204_1$, the significant point that satisfies these two requirements is identified as $301_1$. Where points within a triangle have the same elevation, and the elevation is the maximum deviant value for the triangle, the most significant point is selected by suitable means. In a preferred embodiment, the most significant point in such instances is selected by picking the point closest to the centroid of the triangle.

Figure 4A:
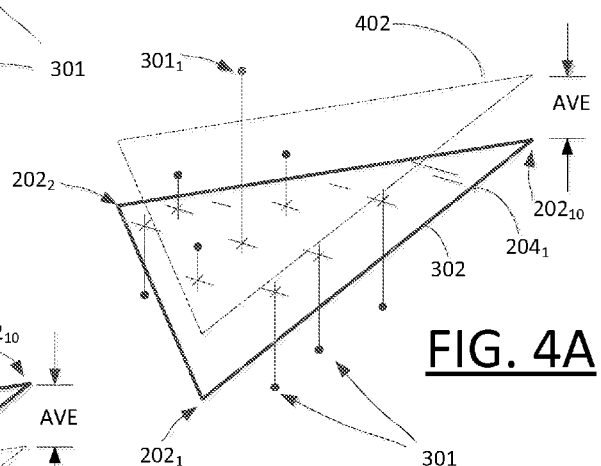
FIG. 4A is a perspective view of the surface in FIG. 3, with an upper accuracy surface shown.
Figure 4B:
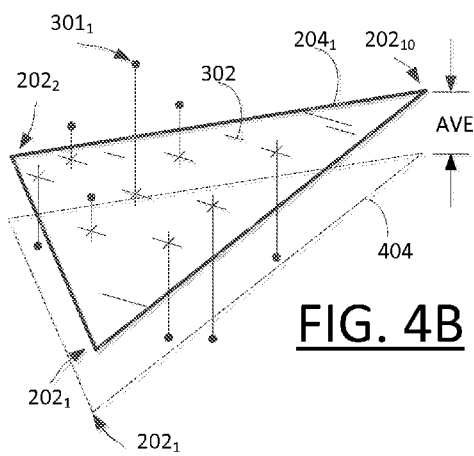
FIG. 4B is a perspective view of the surface in FIG. 3, with a lower accuracy surface shown.

In order to more fully understand the AVE limit described above, reference is made to FIGS. 4A, 4B, and 5. In FIG. 4A, an upper AVE limit is illustrated as a plane 402 which is parallel to plane 302. Similarly, in FIG. 4B, a lower AVE limit is illustrated as a plane 404 which is parallel to plane 302. FIG. 5 shows the upper and lower AVE limits 402, 404. Points 301 which do not have a magnitude of deviation relative to plane 302 which at least exceeds the value the upper and lower AVE limit 402, 404 will not qualify for consideration as a significant point. In FIG. 5, it can be observed that significant point $301_1$ does in fact exceed the AVE limit and has a magnitude of deviation greater than all other points 301 shown in the figure. Accordingly, point $301_1$ would be selected as the significant point for triangle $204_1$.

In step 116, a determination is made as to whether a significant point has been selected for all triangles within the TIN 200. If not, the process iterates in step 118 to the next triangle element and the process repeats until a significant point $301_n$ has been selected for every one of the n triangles within the TIN 200. Thereafter, in step 120, the significant points selected for each triangle are added to the working TIN 200 to create a new working TIN with more triangles.

Figure 6:
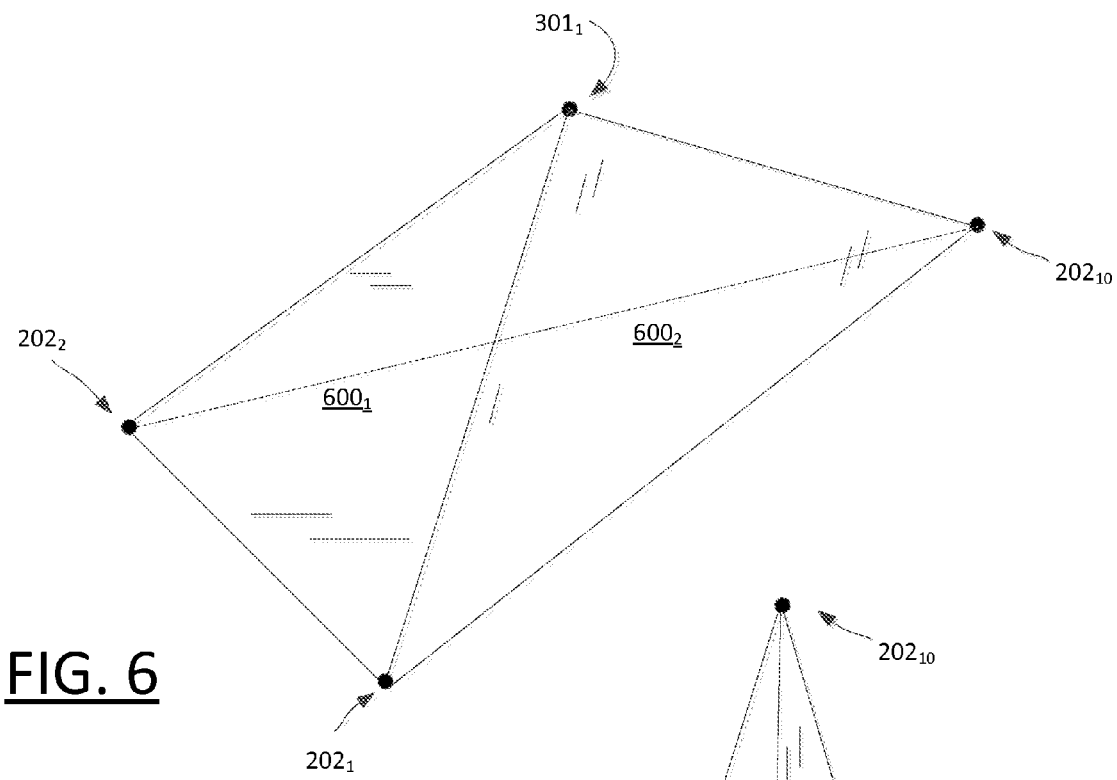
FIG. 6 is a perspective view of a portion of the working TIN corresponding to the triangle element of FIG. 3 after a significant point is added to the working TIN
Figure 7:
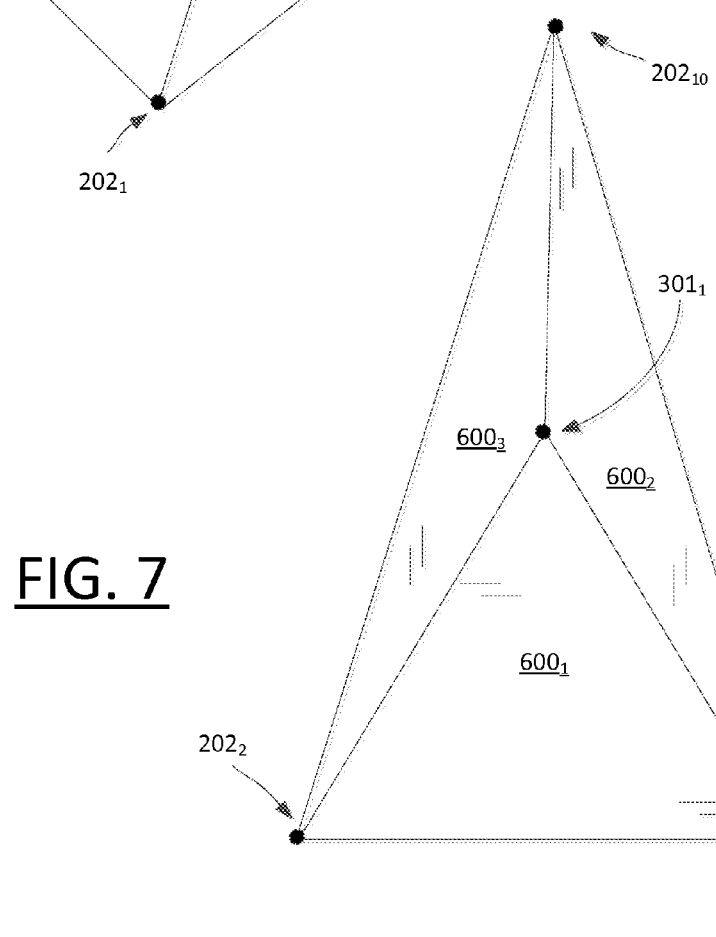
FIG. 7 is a top view of the working TIN shown in FIG. 6.
Figure 8A:
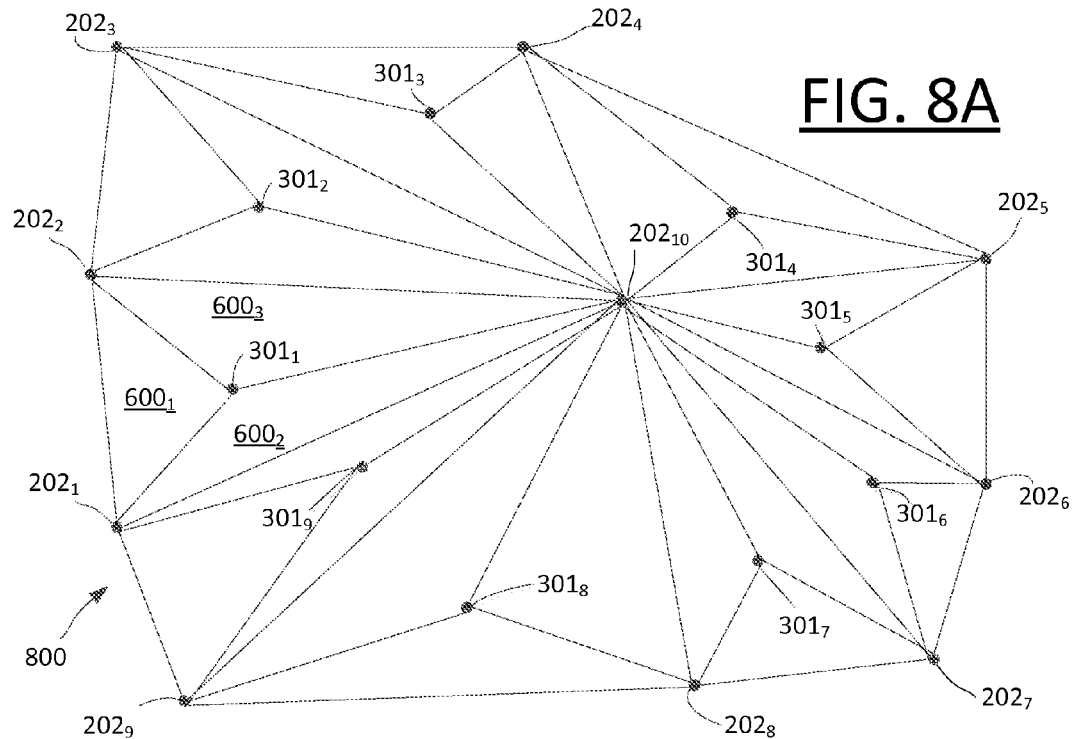
FIG. 8A shows a second iteration of the TIN in FIG. 2, after new significant points have been added in each triangle.

It is useful to refer to FIGS. 6 and 7 for understanding how a significant point can be added to the TIN 200. In these figures, the significant point $301_1$ is added to the triangle $204_1$ defined by points $202_1$, $202_2$, and $202_{10}$. It will be recalled from FIGS. 2 and 3 that these points in TIN 200 previously defined the vertices of triangle $204_1$. However, after adding significant point $301_1$ to the current iteration of the TIN, three new triangles are created. Specifically, the updated TIN now includes new triangles $600_1$, $600_2$ and $600_3$. When the new significant points $301_1, 301_2, 301_3, \ldots 301_9$ are added to all of the triangles in the TIN 200, each triangle in TIN 200 can be updated in a similar way in step 120 to create new triangles. The new triangles form a new working TIN 800a as shown in FIG. 8A, which is based on the initial TIN 200. It can be observed that TIN 800a includes new triangles $600_1$, $600_2$ and $600_3$ and the added significant point $301_1$. These three new triangles $600_1$, $600_2$ and $600_3$ have replaced triangle $204_1$ which was previously included in TIN 200. Similarly, in TIN 800a, significant points $301_2, 301_3, \ldots 301_9$ have been added to the other triangles $204_1, 204_2, 204_3, \ldots 204_9$ that previously composed the TIN 200, and new triangles have replaced each of the triangles from TIN 200.

Figure 8B:
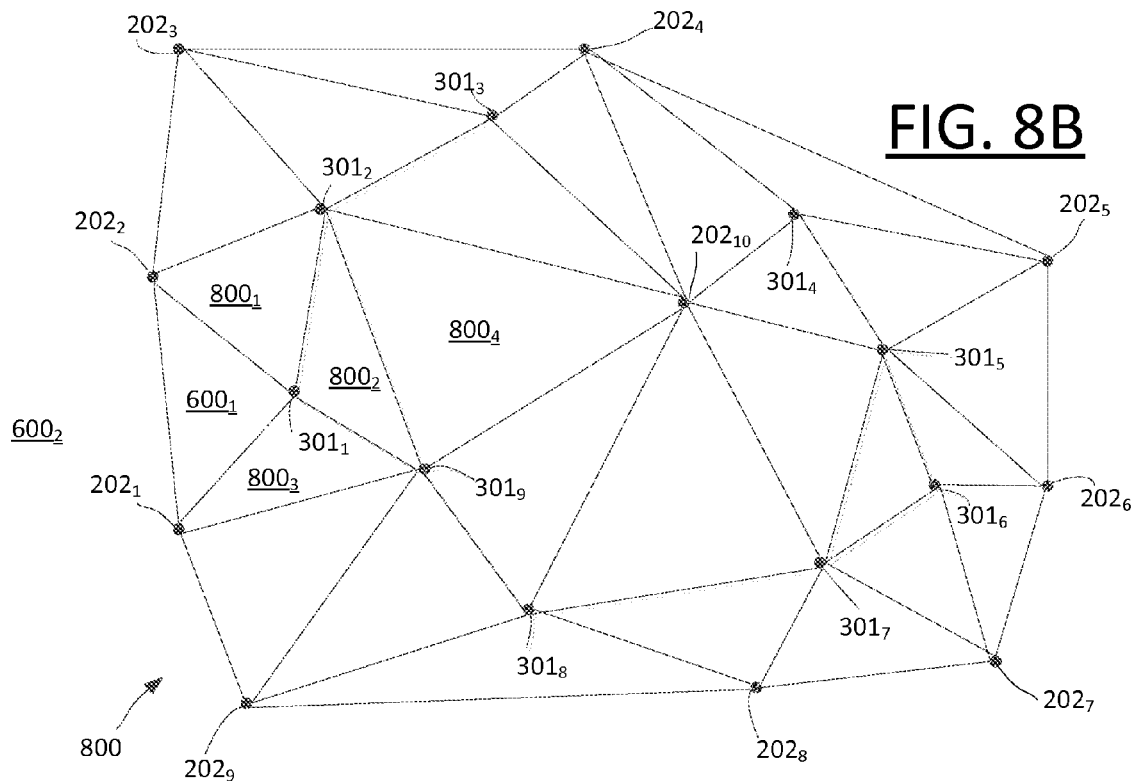
FIG. 8B shows how a second iteration TIN can be formed using the new significant points and employing a constrained Delaunay triangulation.

It can be observed in FIG. 8A, that the new triangles $600_1$, $600_2$ and $600_3$ can have an elongated profile that is not preferred for use in the present TIN model. Many of the other triangles in TIN 800a have this same deficiency. Accordingly, rather than simply adding new triangles $600_1$, $600_2$ and $600_3$, a Delaunay triangulation constraint is preferably applied to the new set of points which comprise the TIN 800a. When the Delaunay triangulation constraint is applied, the points are the same as those shown in TIN 800a, but a different set of triangles are formed. Such an arrangement is illustrated in FIG. 8B. As is known in the art, a Delaunay triangulation for a set of points is a triangulation in which no point is inside the circle drawn through the vertices of any triangle. Delaunay triangulation methods have the advantage of maximizing the vertex angles of all triangles in that TIN. In other words, by applying Delaunay triangulation, elongated triangles can generally be avoided. Note that the TIN 800b has the same points as TIN 800a, but does not contain the same triangles. For example, it can be observed that TIN 800b includes triangle $600_1$ (as in TIN 800a), but also includes new triangles $800_1, 800_2, 800_3,$ and $800_4$.

In step 122, a determination is made as to whether the current iteration of the working TIN satisfies a selected AVE. This step involves determining a z axis deviation for each point within the x, y coordinates of each working triangle (e.g. triangle $800_4$) relative to the plane defined by each triangle. If the deviation of all points within all triangles is less than the allowable vertical error (AVE) then the TIN satisfies the selected AVE and the process terminates in step 124. If the magnitude of deviation for a point within a particular triangle does exceed the AVE, then the process returns to step 112 and a new working TIN is generated using additional significant points that have been identified. These additional significant points are added to the working TIN in step 120 and the current iteration of the working TIN is evaluated again in step 122. When the current iteration of the working TIN satisfies the selected AVE (i.e. there are no points which have a z deviation greater than the AVE limit), then there is no need to add further significant points to the TIN, and the process terminates in step 124. Cloud points found within the AVE of the triangle cannot be marked for deletion or as insignificant until all points within a triangle are so marked, allowing multiple tries for each point to be considered as significant.

In the present invention, points are removed from further consideration if they do not significantly deviate from the best prevailing surface approximation based on other points previously found significant. In some embodiments, these points that are removed from further consideration can be eliminated from the point cloud data set for purposes of thinning the data. This process can significantly reduce the size of the point cloud data file, thereby facilitating its use in various other application. Alternatively, some or all of the points removed from further consideration are retained as part of the data file, but a significance value is assigned to each point. The significance value discussed herein can be based on the absolute value of raw z axis deviation from the plane equation estimate of z or alternatively on some standardized measure of z deviation. In another embodiment, significance might best be expressed by the incremental increase in surface volume of the original test triangle versus the sum of the surface area resulting three triangles created when a new significant point is entered into the working TIN (refer to FIG. 6).

Once complete, the method described herein facilitates generation of a TIN model which is as accurate a version of the point cloud surface as the original, when evaluated from the standpoint of the mean and RMSE of the original. Specifically, the z estimates derived from the final TIN model at the x, y of the control points will be normally distributed and will closely match the normal distribution of the original assessment of points. The preferred equation for estimating z (i.e., zEst(x,y)) from the final model given the x, y coordinates of a control point i is given in Equation 1. This equation is a simple and efficient linear combination of the slopes of two bounding edges of the triangle where the intersection point of the edges are held as a local origin of the plane defined by a triangle's three points.

$$z\text{Est}(x,y)_i = m_{Edge1Tri} * X_{CP} + m_{Edge2Tri} * Y_{CP} + Z_{LocalOrigin} \quad (1)$$

where zEst(x,y) is an estimated z value derived from either the original point cloud or the final TIN at x, y of the control point i depending on the context $X_{CP}$ is the x coordinate of the control point CP;

$Y_{CP}$ is the y coordinate of the control point CP;

$m_{Edge1Tri}$ is the local slope along an edge 1 of the bounding triangle containing the CP;

$m_{Edge2Tri}$ is the local slope along an edge 2 of the bounding triangle containing the CP; and $Z_{LocalOrigin}$ is the intersection point of the two bounding edges of the triangle, which define a local origin of the plane defined by the three vertex points of the triangle.

The edges j=1, 2 are composed of points $(x,y,z)_{LocalOrigin}$ and $(x,y,z)_j$ the edge points opposite the point $(x,y,z)_{LocalOrigin}$ which is referred to herein as $(x,y,z)_{OppPoint}$. The slope (in z) is $m_j$ for a given edge j and can be expressed as:

$$m_j=(z_{OppPoint}-z_{LocalOrigin})/((x_{OppPoint}-x_{LocalOrigin})^2+(y_{OppPoint}-y_{LocalOrigin})^2)^{0.5} \quad (2)$$

The equation components left and right of the of the initial division operation in (2) readily identifies this as the familiar "rise over the run" formulation of slope.

Residuals of the differences in z between estimates and control values are simply:

$$z_{Residual}=zESt-z_{CP} \quad (3)$$

where $z_{Residual}$ is the difference in z from the zEst(x,y) value to the trusted $z_{CP}$ zEst(x,y) is an estimate of surface height at x, y $Z_{CP}$ is the z coordinate of the control point having a higher order accuracy than zEst(x,y)

Validation of the final TIN produced using this process can be made by substituting a model developed using all points. Validation can include a visual appraisal of contours generated for assessment within the final TIN to ensure that they lie with an acceptable distance from a model developed from all cloud points. Likewise derived products such as slopes will render essentially the same results as using all the points.

The processing methods described herein can advantageously be used to uniquely relate accuracy of a point cloud to parameters for thinning such data. More particularly, the method facilitates extrapolating the behavior of a sample of surface points to the surface at large and eliminates the redundant points. Specifically, by selecting an AVE value based on the RMSE, redundant points can be eliminated while those points, which are outside the AVE relative to the mean z value for the sample, are retained. The process is explained below in further detail using the Normal (Gaussian) Curve to illustrate the principles. This Normal Curve is expected to cover most terrain modeling scenarios where the assumption of normality of the errors, as measured by control points against the complete point cloud, can be observed. However, the invention is not limited in this regard and other forms of data distributions besides Normal, can also be used. For example, data distributions such as log-normal, Poisson, and so on, could be needed for other patterns that may be observed in some point cloud data.

RMSE for a set of point cloud data or a model such as the final TIN model can be calculated by comparing a sample of points contained in the point cloud data and coincident in x, y to a set of control points. The control points are highly accurate measurements of terrain elevation (i.e. Z values) at certain identifiable locations within the x, y coordinates of the point cloud imagery. The control point data can be obtained by using conventional surveying equipment to measure actual elevation in the field at points identifiable within the LIDAR imagery. Alternatively, such control points can be obtained by gathering numerous data samples of elevation data (i.e. z values) at a single geographic location using a position sensor, such as a GPS device. These numerous altitude measurements for one geographic location can be averaged together to provide a highly accurate elevation measurement for that particular location. Higher resolution maps or imagery (which have already been tested for accuracy) can also be used to provide control points for elevation data, but will generally not be as accurate as other means described herein.

Once obtained, the available control point data can be compared to the point cloud data set at corresponding x, y locations, and the results can be used to calculate an RMSE value for the point cloud data. RMSE is a frequently used measure of the differences between values predicted by a model or an estimator and the values actually observed from the phenomena being modeled or estimated. In the present invention, the RMSE is used as an estimator of the error contained in the point cloud elevation data. A method for calculating the RMSE will now be described in further detail.

The set of differences in elevation as between a set of control points i=1, 2, 3 . . . n and corresponding points contained in a point cloud data or a final TIN model (or any model derived from a subset of points) can be expressed as Equation 3: The mean of all residuals is simply:

$$zResidualMean=\Sigma(z_{Residual\ i,i=1,n})/n \quad (4)$$

where zResidualMean is the average of the observed residuals in z n is the number of control points for the survey The root mean square error of the zResiduals sample is an estimate of the standard deviation of the entire surface elevations and is computed as follows:

$$RMSE=\Sigma_{i=1,n}(zResidual_i-zResidualMean)/n-1$$

It is reasonable to assume that the frequency of zResiduals and RMSE for all points in the point cloud will have a normal or Gaussian distribution. The RMSE calculated herein is an estimate of the standard deviation a for such point cloud elevation error. Accordingly, the RMSE and well known statistical principals can be used to select an AVE value that will include a certain percentage of all points contained in the point cloud. For example, it is well known that 95% of the area under the normal distribution lies within 1.96 standard deviations of the mean. Accordingly, if a user believes 95% of the points contained in the point cloud data can be safely marked insignificant, then a corresponding AVE value can be calculated by multiplying the RMSE by a standard score value of 1.96. Standard scores are well known in the art and are sometimes also referred to as normal scores or standardized variables. The standard score indicates how many standard deviations a particular point is located above or below a mean. Multiplying the RMSE by the standard score value of 1.96 which will render an extent (area) under the normal curve which includes 95% of all points. We can express this as follows:

$$AVE=1.96*RMSE \quad (6)$$

where the interval −AVE to +AVE contains 95% of the points and those close enough to the mean to be designated as insignificant. Notably, these points which are closest to the mean will have a lesser significance for purposes of generating a terrain model as compared to points that are distributed a greater distance from the mean. At this juncture in the model generation process, the points lying in the periphery of the normal curve are not considered outliers, but unusual (high information content) points. Accordingly, this process will leave us with the remaining 5% of the points in the data set which are most significant, since they are distributed furthest from the mean. Similarly, if the user wished to remove 90% of all points contained in the point cloud, one could calculate a corresponding AVE value (using the standard score value of 1.645) as follows:

$$AVE=1.645*RMSE \quad (7)$$

Where the interval from −AVE to +AVE contains the least significant 90% of the points.

From the foregoing, it will be understood that the RMSE value and the standard score value can allow a user to specify a percentage of the total number of points contained in a data set, and quickly determine the allowable vertical error (i.e., the AVE) that will be present in a terrain model constructed from that portion of the data set. Conversely, the user can select a desired AVE value and quickly determine a percentage of the total points contained in a data set that should be used to construct a model having that AVE value. In particular, a standard score value containing P % of the area under the normal curve can be calculated using the well known equation of the mass density function for a Normal Curve:

$$f(x) = \frac{1}{\sqrt{2\pi}\,\sigma} e^{-\frac{(x-\mu)^2}{2\sigma^2}} \quad (8)$$

where f(x) represents a percentage area under the normal curve at x;
x is a standard score which specifies how many standard deviations a particular point is located above or below the mean
$\sigma$ is the standard deviation for the point set, which in this case is the calculated value of RMSE as calculated using Equation 5.
$\mu$ is the mean zResidual value of the entire model subset Equation (8) can be used to allow a user to understand how a standard score will change in relation to a reduced size point set. Specifically, in Equation 8, f(x) represents the reduced size point set as a percentage of the total number of points, and the variable x represents the standard score. As previously noted, an AVE value can be calculated for each standard score $x=x_i$:

$$\text{AVE}=x_i*\text{RMSE} \quad (9)$$

Accordingly, Equations 8 and 9 can be used to generate a table which specifies the AVE value for a terrain model relative to f(x) (i.e. the percentage portion of the entire point set used to create the model). An abbreviated example of such a table is shown as Table 1 in FIG. 9. Once such a table has been generated, the user can select a percentage of the total number of points a user wishes to include for purposes of generating a model, and the table can be used to quickly determine whether that chosen percentage will provide a model with a desired AVE value. Conversely, the user can choose a desired AVE value and determine a percentage portion of the entire data set which is needed in order to achieve that AVE value.

Figure 10:
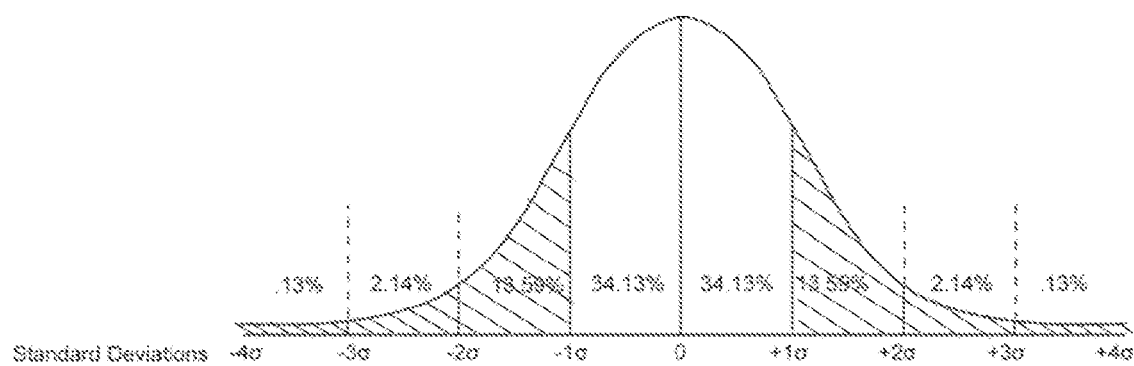
FIG. 10 is a Normal Curve which is useful for understanding how a portion of the total point cloud data set can be selected using the table in FIG. 9.

The foregoing concept is illustrated in FIG. 10, which is a conventional Normal Curve depicting a standard bell shaped distribution of data. For purposes of the present invention, the normal curve represents the distribution of point cloud data along an elevation axis (z-axis) direction, and extending above and below some mean elevation value $z_m$. For data having a distribution defined by a Normal Curve, it is well known that approximately 68.26% (i.e., 34.13%+34.13%) of all data points are located within one standard deviation of the mean; 95.44% of all data points are located within two standard deviations of the mean, and 99.72% of all points are located within three standard deviations from the mean. Each of these percentage portions of the data are illustrated in FIG. 19=0. Assume that for the purposes of the present invention that a user wishes to have an AVE in a terrain model which does not exceed one standard deviation (i.e., standard score=$x_i$=1). Further, assume that the RMSE=3 so that one standard deviation corresponds to an AVE of +/−3 meters, since.

AVE=$x_i$*RMSE=1*3 meters=+/−3 meters

In such a scenario, the user would consult Table 1 in FIG. 9, and would determine that for an AVE of +/−3 meters, only 31.74% of the total set of data points is needed. This means that the 68.26% of the data points which are closest to the mean can be ignored for purposes of building the terrain model. The points which are ignored are those closest to the mean. The points selected for use in creating the terrain model are those contained in the shaded area in FIG. 10. Note that if the preceding steps had been taken as described, and the Allowable Vertical Error (AVE) was chosen to be zero (i.e., ($x_i$=0), then all points will be found significant, and all points would be used to create the terrain model.

It has been previously noted that in the course of forming the TIN, each data point that is evaluated (whether or not included in the TIN) can be assigned a significance value. Once such significance values are assigned, a list of all points in the point cloud data set can be created in a table format similar to Table 2 shown in FIG. 11. Table 2 is an ordered database of potentially significant points, where Significance$_0$>=Significance$_1$>=Significance$_2$ ... >=Significance$_n$ and so on. The table lists a significance value assigned to each row entry for evaluated points. When all points from a data set are written as above, a list of coordinates sorted in descending order (by significance) can be created and used for efficient subsequent retrieval of a sample of points representing a given level of accuracy.

For example, the table could be consulted to identify all points with significance greater than some value SigQuery. With such an arrangement, all points in the ordered database having some level of significance greater than SigQuery are quickly selected by means of very efficient search. The sample of points from the query can then be used to make a new terrain model. This new model will have certain accuracy characteristics of mean and RMSE when compared to the control points of the project area. However, the mean and RMSE values of the smaller data set will not differ statistically as compared to the mean and RMSE obtained when comparing all of the original data points to the control points. Accordingly, a model can be quickly and easily generated (using the smaller data set) which reduces the number of points but without jeopardizing accuracy.

The present invention can be realized in one computer system. Alternatively, the present invention can be realized in several interconnected computer systems. Any kind of computer system or other apparatus adapted for carrying out the methods described herein is suited. A typical combination of hardware and software can be a general-purpose computer system. The general-purpose computer system can have a computer program that can control the computer system such that it carries out the methods described herein.

The present invention can also take the form of a computer program product on a computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

Figure 12:
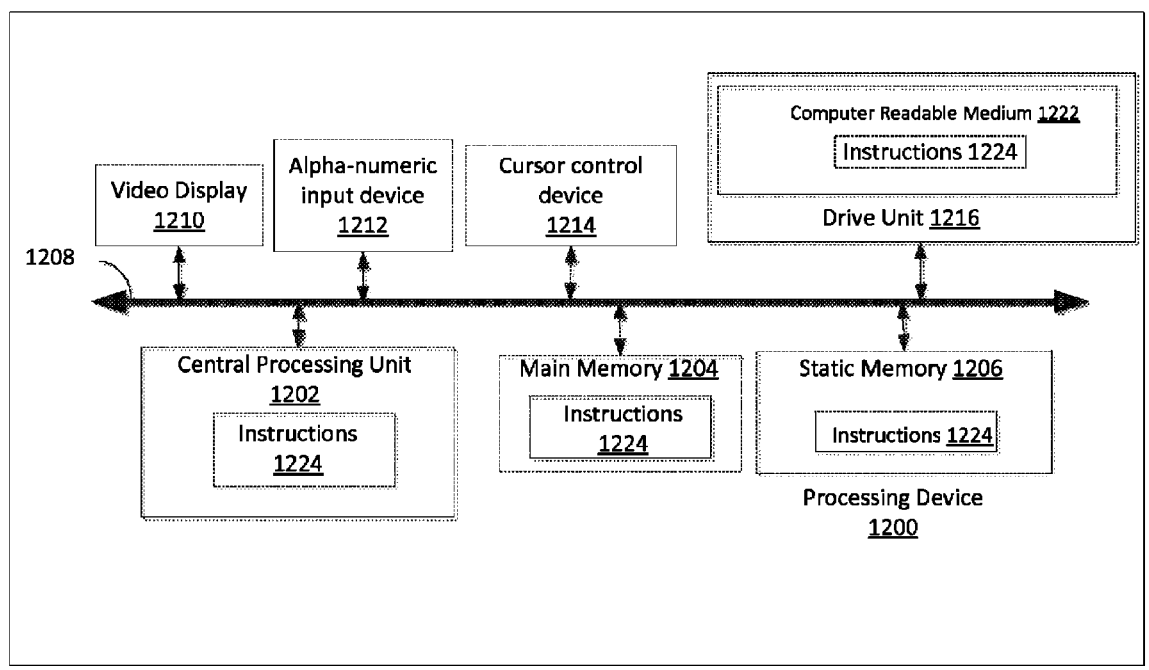
FIG. 12 shows a computer system in which the methods described herein can be implemented.

A computer system for implementing the methods and processes described herein. can comprise various types of computing systems and devices, including a server computer, a client user computer, a personal computer (PC), a tablet PC, a laptop computer, a desktop computer, or any other device capable of executing a set of instructions (sequential or otherwise) that specifies actions to be taken by that device. An example of a computer system 1200 on which the invention can be carried out is provided in FIG. 12. A single computer is illustrated in FIG. 12, but the phrase "computer system" shall be understood to include any collection of computing devices that individually or jointly execute a set (or multiple sets) of instructions to perform any one or more of the methodologies discussed herein.

The computer system 1200 includes a processor 1202 (such as a central processing unit (CPU), a graphics processing unit (GPU, or both), a main memory 1204 and a static memory 1206, which communicate with each other via a bus 1208. The computer system 1200 can further include a display unit 1210, such as a video display (e.g., a liquid crystal display or LCD), a flat panel, a solid state display, or a cathode ray tube (CRT)). The computer system 1200 can include an alpha-numeric input device 1212 (e.g., a keyboard), a cursor control device 1214 (e.g., a mouse), a disk drive unit 1216, and a network interface device 1220.

The disk drive unit 1216 includes a computer-readable storage medium 1222 on which is stored one or more sets of instructions 1224 (e.g., software code) configured to implement one or more of the methodologies, procedures, or functions described herein. The instructions 1224 can also reside, completely or at least partially, within the main memory 1204, the static memory 1206, and/or within the processor 1202 during execution thereof by the computer system 1200. The main memory 1204 and the processor 1202 also can constitute machine-readable media. The database of point cloud data upon which thinning is performed can comprise any suitable data store that is directly or indirectly accessible by the processor 1202. For example the point cloud data can be stored in the computer readable medium 1222 or the main memory 1204.

Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present invention, the methods described above are stored as software programs in a computer-readable storage medium and are configured for running on a computer processor. Furthermore, software implementations can include, but are not limited to, distributed processing, component/object distributed processing, parallel processing, virtual machine processing, which can also be constructed to implement the methods described herein.

In the various embodiments of the present invention a network interface device 1220 connected to a network environment communicates over the network using the instructions 1224. The instructions 1224 can further be transmitted or received via the network interface device 1220.

While the computer-readable storage medium 1222 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape.

Those skilled in the art will appreciate that the computer system architecture illustrated in FIG. 12 is one possible example of a computer system. However, the invention is not limited in this regard and any other suitable computer system architecture can also be used without limitation.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

We claim:

1. A method for using a computer processor to derive significant points from a point cloud containing data representing a physical surface and defined within a three dimensional coordinate system, comprising:

calculating a mean value for z coordinate values associated with a plurality of points having x, y and z coordinates within said three-dimensional coordinate systems, said mean value representing an average elevation for an area included within x, y coordinates of the data contained in the point cloud;

using said computer processor to select from said point cloud data, an initial set of points having z coordinate values which have first magnitudes of absolute deviation from said mean value that exceed second magnitudes of absolute deviation from said mean value which are associated with at least an initial percentage of data points contained in the point cloud data;

constructing with said computer processor a triangulated irregular network (TIN) using said initial set of points, said TIN composed of a plurality of triangles;

determining, by said computer processor, if there is a significant point that exists among said plurality of points contained within an x, y extent of each said triangle;

updating said TIN with said computer processor to include said initial set of points and any significant points determined to exist within said plurality of triangles; and repeating said determining and said updating steps until there are no significant points found within said triangles.

2. The method according to claim 1, wherein said determining step further comprises identifying a point as a significant point only if it has a z coordinate value that deviates from a plane of said triangle within which the x, y position of said point is contained, by an amount which is greater than or equal to all other of said plurality of points within said x, y extent of said triangle.

3. The method according to claim 2, wherein said determining step further comprises identifying a point as a significant point only if it has a z coordinate value that deviates from a plane of said triangle within which the x, y position of said point is contained, by an amount exceeding an allowable vertical error (AVE) limit.

4. The method according to claim 1, further comprising calculating a root mean square error (RMSE) for said point cloud data based on a plurality of control points which comprise more accurate measurements, as compared to said point cloud data, of z coordinate values at locations within the x, y extent of said point cloud.

5. The method according to claim 4, further comprising calculating with said computer processor a vertical error value for said TIN based on said RMSE value, and a standard score corresponding to a user selected portion of said point cloud that is used to form said TIN.

6. The method according to claim 4, further comprising using said computer processor to determine a portion of said point cloud data that is necessary to form said TIN based on said RMSE value and a user selected allowable vertical error (AVE) value for said TIN.

7. The method according to claim 4, further comprising generating with said computer processor a table including a plurality of allowable vertical error values for said TIN and a corresponding plurality of portion values, each of said plurality of portion values specifying a portion of said point cloud data necessary to provide said TIN with respective ones of said plurality of allowable vertical error values based on said RMSE.

8. The method according to claim 7, further comprising generating said TIN based on a portion value determined in accordance with a user selected one of said allowable vertical error values presented in said table.

9. The method according to claim 1, wherein said updating step further comprises using said computer processor to apply a Delaunay constraint to said TIN.

10. The method according to claim 1, wherein said point cloud data represents a terrain and said z coordinate represents an elevation of said terrain.

11. The method according to claim 1, further comprising thinning said point cloud data by using said computer processor to exclude from a final data set any of said plurality of points that are not included in at least one of said initial set of points and said significant points.

12. The method according to claim 1, further comprising:
determining a relative significance value for each of said plurality of points in said point cloud, said relative significance value determined based on a deviation of each said point from said mean value; and
storing said plurality of points in an ordered database having an order defined by said relative significance values.

13. The method according to claim 12, further comprising selecting a portion of said plurality of points for use in forming said TIN, said portion defined as a sub-set of said points in said ordered database having a range of relative significance values determined in accordance with a user selection.

14. A system for deriving significant points from a point cloud containing data representing a surface and defined within a three dimensional coordinate system, comprising a computer processor configured for performing the steps of:
calculating a mean value for z coordinate values associated with a plurality of points having x, y and z coordinates within said three-dimensional coordinate systems, said mean value representing an average elevation for an area included within x, y coordinates of the data contained in the point cloud;
selecting from said point cloud data, an initial set of points having z coordinate values which have first magnitudes of absolute deviation from said mean value that exceed second magnitudes of absolute deviation from said mean value which are associated with at least an initial percentage of data points contained in the point cloud data;
constructing a triangulated irregular network (TIN) using said initial set of points, said TIN composed of a plurality of triangles;
determining if there is a significant point that exists among said plurality of points contained within an x, y extent of each said triangle;
updating said TIN to include said initial set of points and any significant points determined to exist within said plurality of triangles;
repeating said determining and said updating steps until there are no significant points found within said triangles.

15. The system according to claim 14, wherein said determining step further comprises identifying a point as a significant point only if it has a z coordinate value that deviates from a plane of said triangle within which the x, y position of said point is contained, by an amount which is greater than or equal to all other of said plurality of points within said x, y extent of said triangle.

16. The system according to claim 15, wherein said determining step further comprises identifying a point as a significant point only if it has a z coordinate value that deviates from a plane of said triangle within which the x, y position of said point is contained, by an amount exceeding an allowable vertical error (AVE) limit.

17. The system according to claim 14, wherein said computer processor is further configured to calculate a root mean square error (RMSE) for said point cloud data based on a plurality of control points which comprise more accurate measurements, as compared to said point cloud data, of z coordinate values at locations within the x, y extent of said point cloud.

18. The system according to claim 17, wherein said computer processor is further configured to calculate a vertical error value for said TIN based on said RMSE value, and a standard score corresponding to a user selected portion of said point cloud that is used to form said TIN.

19. The system according to claim 17, wherein said computer processor is further configured to determine a portion of said point cloud data that is necessary to form said TIN based on said RMSE value and a user selected allowable vertical error (AVE) value for said TIN.

20. The system according to claim 17, wherein said computer processor is further configured to generate a table including a plurality of allowable vertical error values for said TIN and a corresponding plurality of portion values, each of said plurality of portion values specifying a portion of said point cloud data necessary to provide said TIN with respective ones of said plurality of allowable vertical error values based on said RMSE.

21. The system according to claim 20, wherein said computer processor is further configured to generate said TIN based on a portion value determined in accordance with a user selected one of said allowable vertical error values presented in said table.

22. The system according to claim 14, wherein said updating step further comprising applying a Delaunay constraint to said TIN.

23. The system according to claim 14, wherein said point cloud data represents a terrain and said z coordinate represents an elevation of said terrain.

24. The system according to claim 14, wherein said computer processor is further configured to thin said point cloud data by excluding from a final data set any of said plurality of points that are not included in at least one of said initial set of points and said significant points.

25. The system according to claim 14, wherein said computer processor is further configured to:
 determine a relative significance value for each of said plurality of points in said point cloud, said relative significance value determined based on a deviation of each said point from said mean z coordinate value; and
 store said plurality of points in an ordered database having an order defined by said relative significance values.

26. The system according to claim 25, wherein said computer processor is further configured to select a portion of said plurality of points for use in forming said TIN, said portion defined as a sub-set of said points in said ordered database having a range of relative significance values determined in accordance with a user selection.

27. A non-transitory machine-readable storage device having stored thereon sequences of instructions that, when executed by a machine, cause the machine to perform actions which derive significant points from a point cloud containing data representing a physical surface and defined within a three dimensional coordinate system, the actions comprising:
 calculating a mean value for z coordinate values associated with a plurality of points having x, y and z coordinates within said three-dimensional coordinate systems, said mean value representing an average elevation of an area included within x, y coordinates of the data contained in the point cloud;
 selecting from said point cloud data, an initial set of points having z coordinate values which have first magnitudes of absolute deviation from said mean value that exceed second magnitudes of absolute deviation from said mean value which are associated with at least an initial percentage of data points contained in the point cloud data;
 constructing a triangulated irregular network (TIN) using said initial set of points, said TIN composed of a plurality of triangles;
 determining if there is a significant point that exists among said plurality of points contained within an x, y extent of each said triangle;
 updating said TIN to include said initial set of points and any significant points determined to exist within said plurality of triangles; and
 repeating said determining and said updating steps until there are no significant points found within said triangles.

* * * * *